May 7, 1963 R. D. HULL 3,088,691
DRAG BRAKE FOR SPINNING REELS
Original Filed Oct. 12, 1956 6 Sheets-Sheet 1
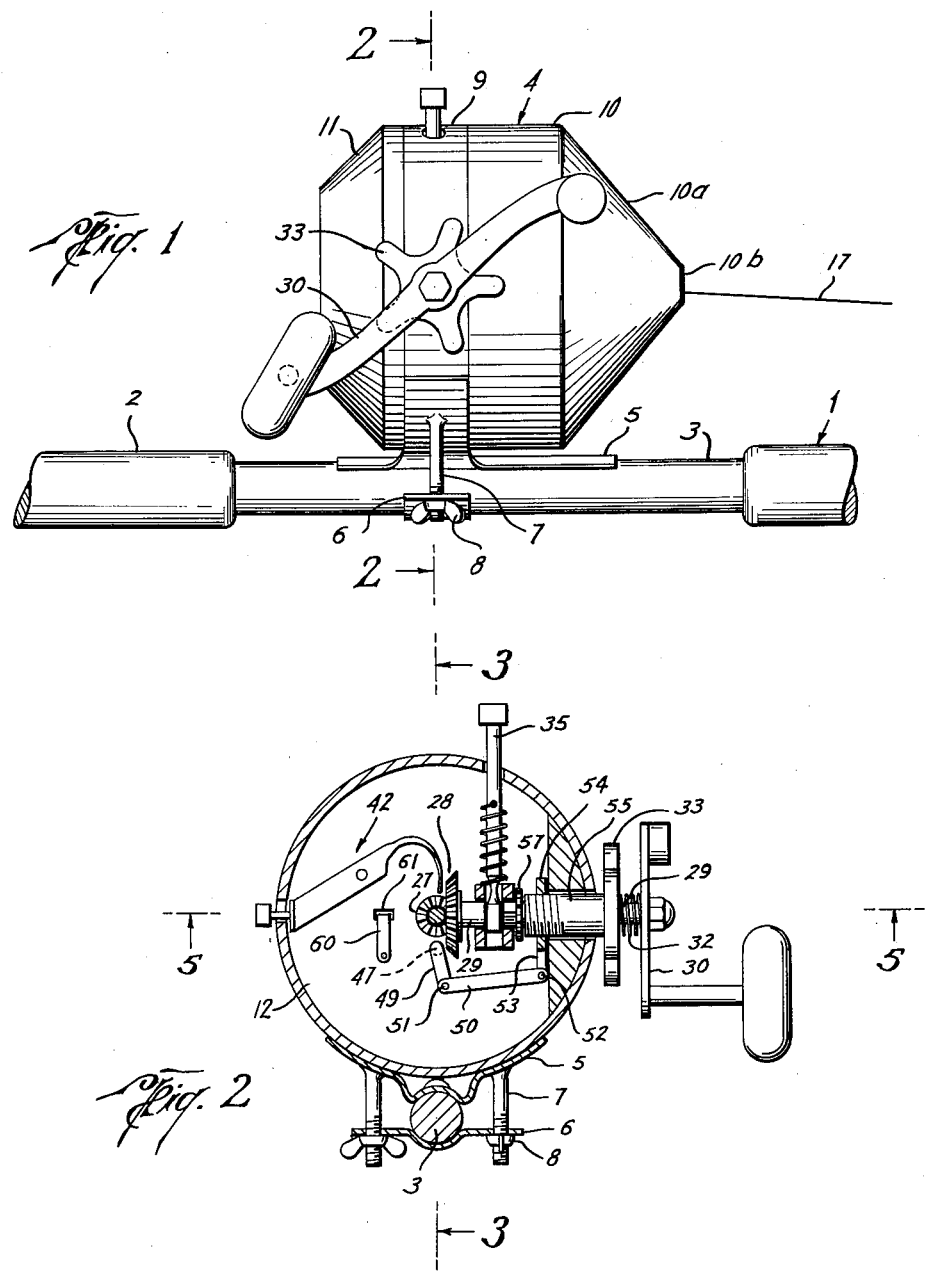
INVENTOR.
R. Dell Hull
BY
ATTORNEYS May 7, 1963 R. D. HULL 3,088,691
DRAG BRAKE FOR SPINNING REELS
Original Filed Oct. 12, 1956 6 Sheets-Sheet 2
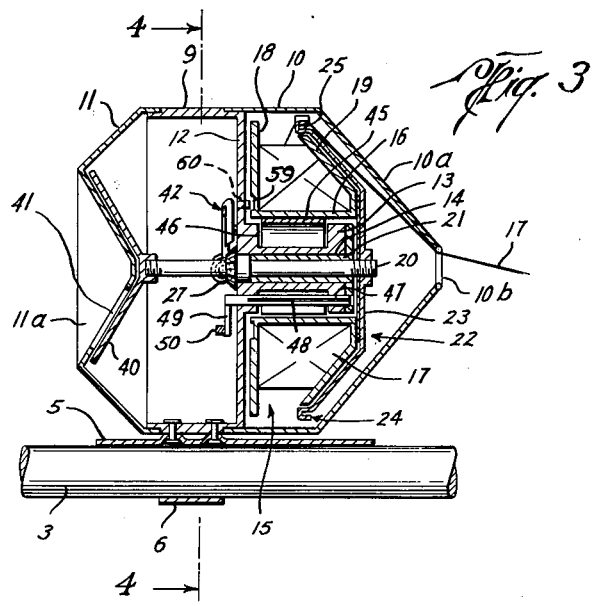
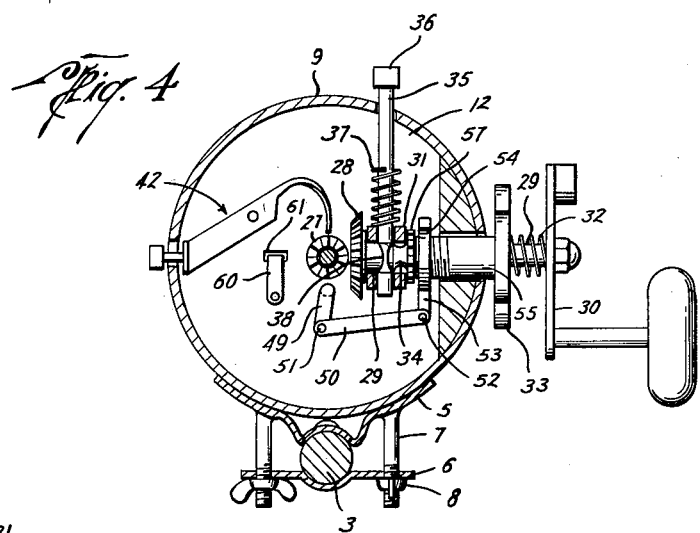
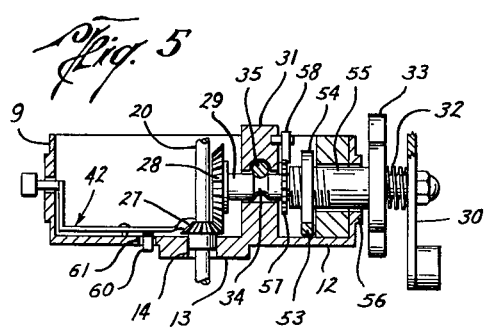
INVENTOR.
R. Dell Hull
BY
ATTORNEYS May 7, 1963 R. D. HULL 3,088,691
DRAG BRAKE FOR SPINNING REELS
Original Filed Oct. 12, 1956 6 Sheets-Sheet 3
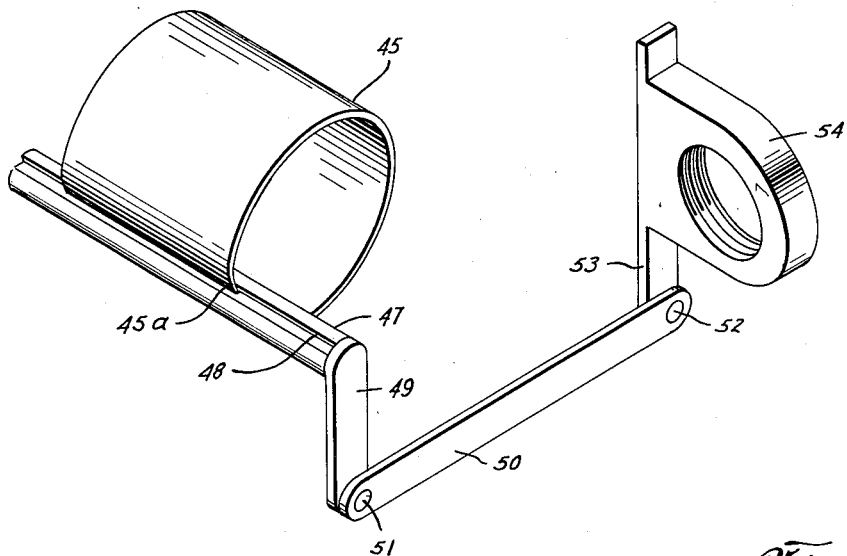
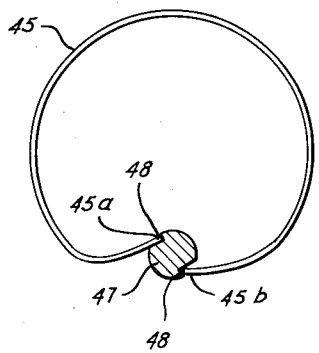
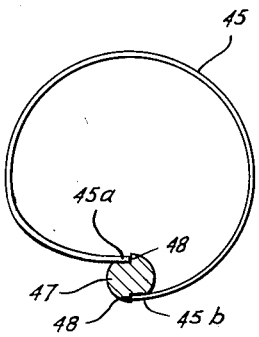
INVENTOR.
R. Dell Hull
BY
ATTORNEYS May 7, 1963 R. D. HULL 3,088,691
DRAG BRAKE FOR SPINNING REELS
Original Filed Oct. 12, 1956 6 Sheets-Sheet 4
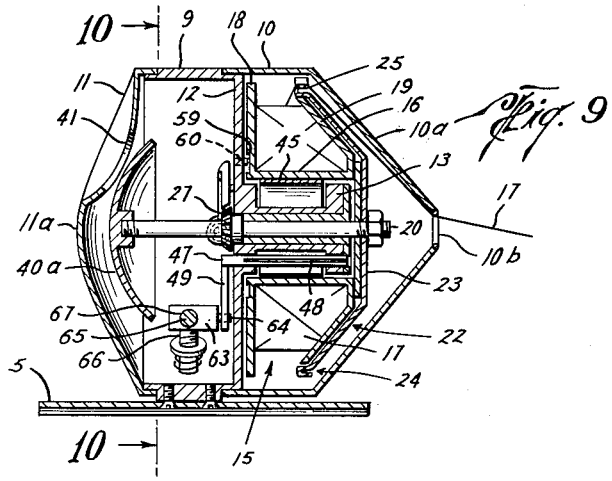
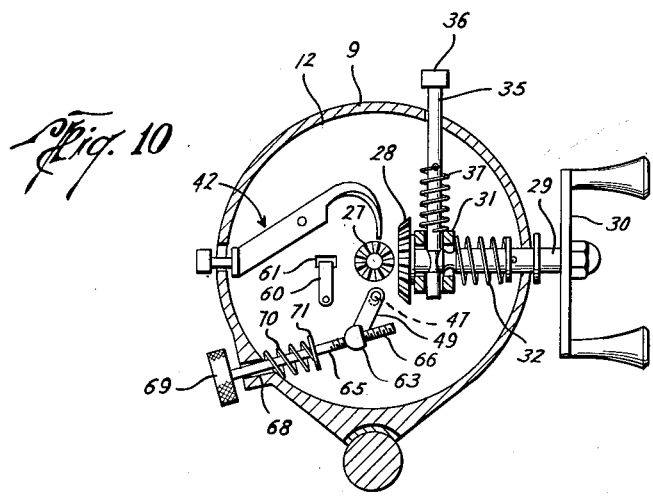
INVENTOR.
R. Dell Hull
BY
Pennie, Edmonds, Morton, Barrows and Taylor
ATTORNEYS May 7, 1963 R. D. HULL 3,088,691
DRAG BRAKE FOR SPINNING REELS
Original Filed Oct. 12, 1956 6 Sheets-Sheet 5
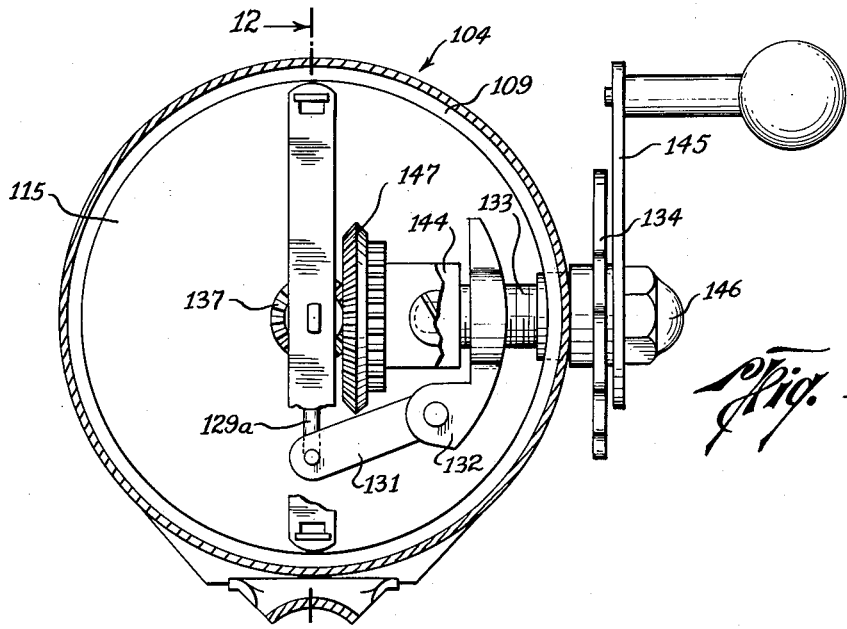
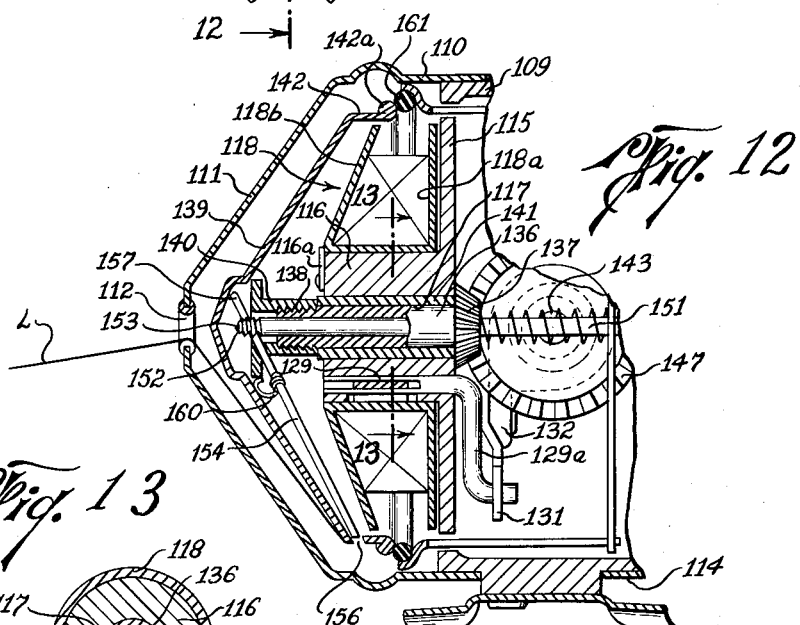
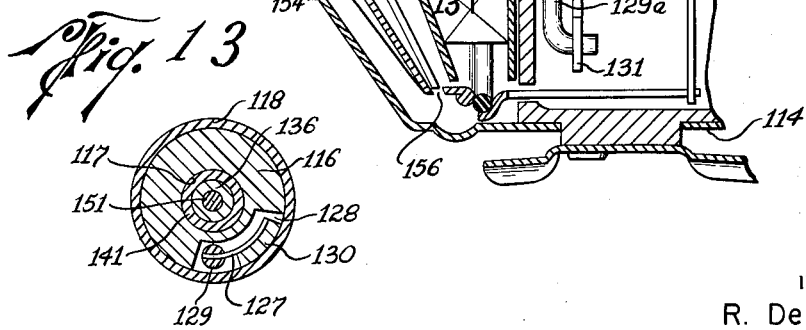
INVENTOR
R. Dell Hull
BY
ATTORNEYS May 7, 1963 R. D. HULL 3,088,691
DRAG BRAKE FOR SPINNING REELS
Original Filed Oct. 12, 1956 6 Sheets-Sheet 6
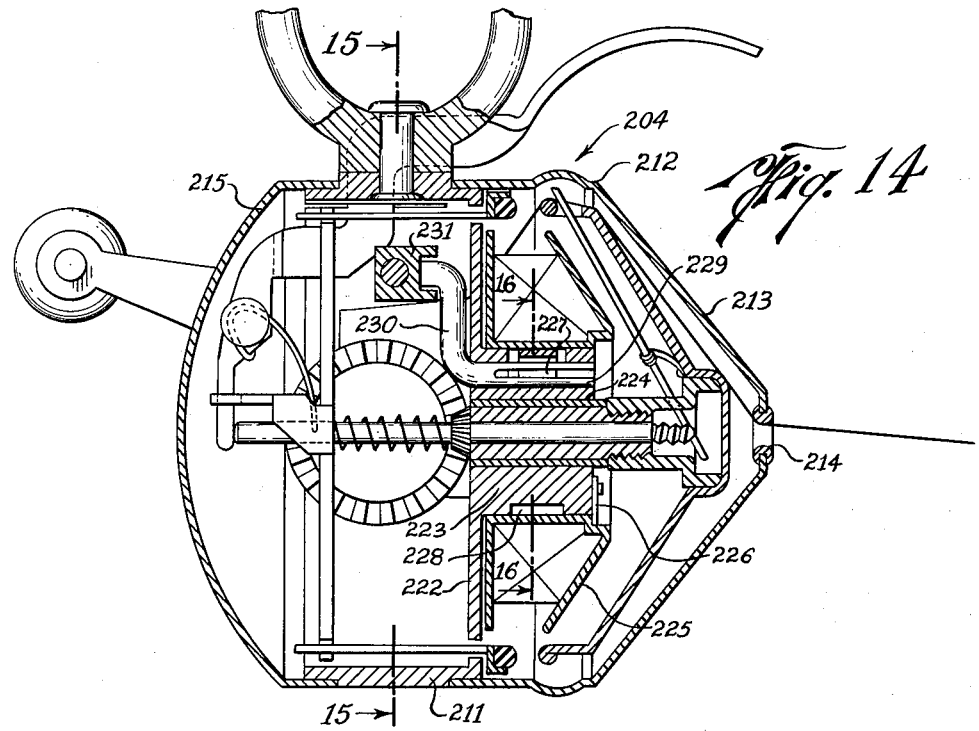
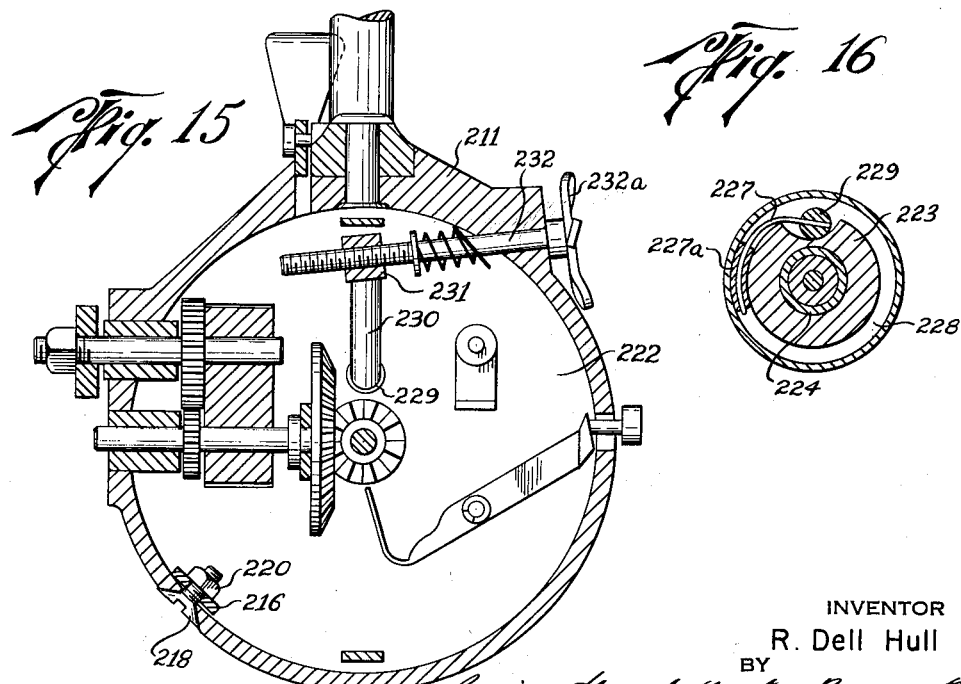
INVENTOR
R. Dell Hull
BY
ATTORNEYS United States Patent Office 3,088,691
Patented May 7, 1963

3,088,691
DRAG BRAKE FOR SPINNING REELS
R. Dell Hull, 1131 E. Easton St., Tulsa 1, Okla.
Continuation of application Ser. No. 615,168, Oct. 12, 1956. This application July 25, 1960, Ser. No. 45,129
13 Claims. (Cl. 242—84.5)

This invention relates to fishing reels and more particularly to casting reels of the so-called "spinning" type. More especially, the invention is concerned with an improved drag brake for spinning reels, permitting removal of line from a reel upon application to the line of tensions of predetermined magnitudes.

This application is a continuation of my U.S. application, Serial No. 615,708, filed October 12, 1956, now abandoned, which in turn was a continuation-in-part application based upon the disclosures of my prior U.S. applications, Serial No. 363,578, filed June 23, 1953, Serial No. 602,566, filed August 7, 1956, now Patent No. 2,964,257, and Serial No. 605,798, filed August 23, 1956, now Patent No. 2,929,579, application Serial No. 363,578 is now abandoned.

Spinning reels of known design often employ a line spool which is ordinarily stationary during both casting and retrieving. Rewinding or retrieving of the line is effected by means of a rotatable head mounted in front of the line spool, which guides the line onto the spool. The head rotates during rewinding and is provided with pick-up means which wrap the line on the spool during rewinding. In some reels, the head rotates during casting, as well as rewinding, and controls the outward movement of the line during casting.

A principal feature of the present invention is the provision of a spinning-type casting reel including an improved drag brake for the line spool which will allow controlled withdrawal of line from the spool by a fish to prevent breakage of the line.

More specifically, the invention provides a new spinning reel in which the line spool is normally non-rotatable, but co-acts with an improved form of drag brake to permit controlled withdrawal of the line regardless of any manipulation of the pick-up head. The spool is mounted on a hub, forming a fixed part of the reel frame; and the brake is housed within the hub and is provided with means accessible from the exterior of the reel housing for accurately adjusting the braking force.

Other advantageous features of the invention will become more readily apparent from the following detailed description when read in conjunction with the accompanying drawing, which illustrates several useful embodiments of the invention:

In the drawing:

FIG. 1 is a side elevation of a reel in accordance with one embodiment of this invention, the reel being shown in position on a fishing rod;

FIG. 2 is a transverse, vertical sectional view on line 2—2 of FIG. 1, showing actuating elements for the drag brake;

FIG. 3 is a longitudinal, sectional view on line 3—3 of FIG. 2;

FIG. 4 is a view similar to FIG. 2 showing a second position of the drag brake actuating elements;

FIG. 5 is a fragmentary transverse sectional view on line 5—5 of FIG. 2;

FIG. 6 is an enlarged perspective view on the principal drag brake elements of the reel of FIG. 1;

FIG. 7 is a cross-sectional view of the drag brake elements of the reel of FIG. 1, with the brake spring in expanded position;

FIG. 8 is a view similar to FIG. 7 showing the drag brake spring in contracted position;

FIG. 9 is a longitudinal, sectional view similar to FIG. 3, showing a somewhat modified form of reel and drag brake;

FIG. 10 is a transverse, vertical, sectional view on line 10—10 of FIG. 9;

FIG. 11 is a transverse, vertical sectional view of a spinning reel incorporating another modified form of spool drag brake;

FIG. 12 is a fragmentary, longitudinal sectional view of the reel of FIG. 11, taken generally on line 12—12 of FIG. 11;

FIG. 13 is a fragmentary cross-sectional view taken along line 13—13 of FIG. 12;

FIG. 14 is a longitudinal sectional view of a spinning reel incorporating a further modified form of spool drag brake;

FIG. 15 is a cross-sectional view taken generally along line 15—15 of FIG. 14; and FIG. 16 is a cross-section view taken along line 16—16 of FIG. 14.

Referring now to the drawinfi, and initially to FIGS. 1–10 thereof, the reference numeral 1 designates generally a fishing rod of any desired construction having a handle portion 2 and a reel seat portion 3.

The reel, designated generally by the numeral 4, is mounted on a supporting plate 5 adapted to be secured to reel seat portion 3 in any suitable manner. As shown, a clamping plate 6 is disposed beneath reel seat portion 3 and is releasably connected to supporting plate 5 by means of studs 7 depending from plate 5 on opposite sides of clamping plate 6. By means of wing nuts 8 applied to studs 7, clamping plate 6 may be drawn toward supporting plate 5 to thereby clamp seat portion 3 tightly between them, as shown, so as to secure the reel to the rod.

The reel comprises a generally circular frame or casing 9 formed of any suitable material and provided with snugly fitting removable front and rear covers 10 and 11, respectively. Front cover 10 has a generally conical forward tapering portion 10a having at its apex an opening 10b through which a line 17 passes to and from the reel.

As best seen in FIG. 3, the reel frame 9 is provided with a stationary front wall 12 having a generally cylindrical hub 13 extending forwardly from the center of the wall. Hub 13 is provided with an axial bore 14 which opens rearwardly through wall 12. A spool, designated generally by the numeral 15, adapted to receive the line 17, is rotatably mounted on hub 13. Spool 15 comprises a cylindrical sleeve 16 having an annular flange 18 secured to the rearward end of the sleeve and extending generally normal to the axis of the sleeve, and a flange 19 secured to the forward end of the sleeve and inclined rearwardly thereof toward flange 18, as shown.

A main shaft 20 extends axially through the reel and bore 14, and is rotatably supported in the hub by means of a bearing 21. The shaft 20 carries on its forward end, in front of spool 15, a head, designated generally by the numeral 22, which is suitably secured to shaft 20 for rotation therewith. As best seen in FIG. 3, head 22 comprises a disk-like body 23, preferably constructed of relatively thin metal, and of generally concave-convex shape conforming generally to the shape of front spool flange 19 and being slightly larger in diameter than the latter. The periphery of body 23 is provided with an annular flange, designated generally by the numeral 24, which extends rearwardly over the periphery of spool flange 19 and is provided with a plurality of circumferentially spaced projections or notches 25 engageable with line 17. Flange 24 is advantageously formed by bending the periphery of body 23 to extend rearwardly over spool flange 19 and then reversing it upon itself to form radially spaced generally parallel layers. The specific construction of the head 22 forms the subject matter of my co-pending application Serial No. 539,509, filed October 10, 1955, now Patent No. 2,929,578, and is more fully described therein.

A bevel gear 27 is mounted on main shaft 20 rearwardly of wall 12 and meshes with a bevel gear 28. The latter is mounted on a crank shaft 29 which extends through the side wall of the casing and is provided with an operating handle 30. Crank shaft 29 is mounted for axial movement to permit engagement and disengagement of gears 27 and 28.

Mounted on the rear face of wall 12 is a bearing block 31 in which crank shaft 29 is axially slidable. A coil spring 32 is arranged on crank shaft 29 in compression between handle 30 and a star wheel 33, the function of which will be subsequently described. Spring 32 serves to resiliently bias crank shaft to the right, as seen in FIG. 4, so as to disengage gears 27 and 28. On the portion of crank shaft 29 within bearing block 31, the crankshaft is provided with a circumferential groove 34 curved on a circular radius.

A clutch operating shaft or rod 35 extends through an opening in the top of the casing and is provided with a button 36 on its upper end, a coil spring 37 is arranged on rod 35 with one end bearing on the top of bearing block 31 and the other end secured to rod 35, spring 37 serving to resiliently bias rod 35 upwardly. The portion of rod 35 within the bearing block is also provided with a circumferential groove 38 cut on a curved radius. Crank shaft 29, rod 35 and their respective grooves 34 and 38 form a clutch mechanism for effecting engagement and disengagement of the gears 27 and 28. Such a clutch and its mode of operation is fully described in my United States Patent No. 2,541,360, and the details of this clutch mechanism do not, therefore, form a part of this invention.

A brake mechanism for controlling the rotation of head 22 consists of a concave disk-like member 40 which is mounted on the rearward end of main shaft 20. The rear wall 11a of rear cover 11 is inwardly depressed to conform generally to the shape of brake member 40 which is slightly spaced from the latter. An opening 41 is provided in wall 11a through which the thumb of the operator may be placed to engage the brake member.

A click member, designated by the numeral 42 may be mounted in casing 9 for engagement and disengagement with gear 27. The click member 42 may be selectively moved into operative and inoperative positions, in the usual manner, by manipulation of a lever portion thereof which projects from the reel casing 9.

In accordance with the invention, an improved drag brake mechanism is incorporated in the reel for controlling the rotation of spool 15 on the hub 13. This mechanism comprises a generally circular brake member 45 constructed of flat spring steel and positioned in an annular recess 46 provided in the periphery of hub 13. This brake member is arranged to be radially contracted and expanded relative to the surrounding wall of spool sleeve 16 to thereby vary the magnitude of the frictional force between brake member 45 and the spool. To accomplish this function, the ends 45a and 45b of brake member 45 are engaged by a brake-actuating lever 47 which projects through the frame wall 12 and is rotatably journaled in the hub 13, at one side thereof, parallel to the axis of the hub. The lever 47 is provided, on diametrically opposite sides thereof, with a pair of longitudinally extending oppositely facing shoulders 48 (see particularly FIGS. 6 to 8), which are adapted to be engaged by the opposite ends of brake member 45. The brake member will normally be preformed to a nominal diameter, approximating that of the bore of spool sleeve 16, so that in its unstressed condition it will remain contracted to a position wherein it exerts a slight amount of friction on sleeve 16. This contracted position is illustrated particularly in FIG. 8. When the lever 47 is rotated in the counterclockwise direction, as viewed in FIG. 7, the engagement of shoulders 48 with ends 45a and 45b of the brake member will force these ends apart to thereby radially expand the member 45 and increase the frictional force of the brake member on sleeve 16. Obviously the degree to which ends 45a and 45b are forced apart will control the frictional force exerted on sleeve 16.

In order to rotate or rock the brake actuating lever 47, a crank arm portion 49 thereof is integrally connected to the rearward end of the lever 47 adjacent wall 12. A link 50 has one end pivotally connected by means of a pivot pin 51 to the free end of arm 49 and the other end is pivotally connected by means of a pivot pin 52 to an ear 53 provided on a nut or crosshead 54 which is slidably movable laterally over the rear face of wall 12. Nut 54 is threadedly mounted on an externally threaded drive sleeve 55 which is concentrically mounted on crank shaft 29 and is journaled in a bearing 56 mounted on the side wall of the casing. The outer end of drive sleeve 55 projects through the side wall of the casing and is rigidly secured to the star wheel 33 previously mentioned. With this arrangement, it will be seen that crank shaft 29 will be independently rotatable and longitudinally slidable relative to sleeve 55 and that the latter may be independently rotatable relative to crank shaft 29 in order to reciprocate nut 54. Ears 53 on nut 54 engage the rear face of wall 12 to thereby prevent rotation of the nut. Thus, by rotating drive sleeve 55, the nut may be reciprocated longitudinally of the drive sleeve to correspondingly rock actuating rod 47.

As may best be seen in FIGS. 2, 4 and 5, a toothed ratchet 57 is slidably mounted on crank shaft 29 between the side of bearing block 31 and the inner end of drive sleeve 55 but is fixed against rotation relative to the crank shaft. A pawl 58 pivotally mounted on the side bearing block 31 is adapted to engage the teeth of ratchet 57 to thereby prevent reverse rotation of crank shaft 29. The rear face of spool flange 18 may be provided with an annular series of notches 59 which are engageable by a spring dog 60 mounted on the rearward face of wall 12 and projecting through an opening 61 in the latter into resilient engagement with notches 59, to provide an audible signal for indicating to the operator that spool 15 is rotating. This latter signalling mechanism may best be seen in FIGS. 2 and 5.

In operation, when casting, gears 27 and 28 are disengaged, occupying positions substantially as shown in FIG. 4. Spool 15 will be stationary during the cast, usually being held in stationary position by the friction of brake member 45 which, even in the fully contracted position, as illustrated in FIGS. 4 and 8, will ordinarily exert sufficient friction on sleeve 16 to hold the spool stationary. Ordinarily the drag brake will be set beforehand to apply a desired amount of friction to the spool to resist rotation by any pull exerted on line 17 until the pulling force approaches the breaking strength of the line. In any case, with spool 15 substantially stationary, the cast is made in the usual manner and the weight of the lure causes the line to feed from the spool over flange 19, as in the usual spinning type reel. The line passing over the periphery of head 22 engages one of the notches 25 and rotates the head. As long as the line is being pulled from the spool, the head continues to revolve. When the cast is completed and the line stops its outward pull, the line is thrown from the notch in the head which permits the head to continue to rotate until its rotation is stopped by friction. This results in the elimination of backlash. While the line is engaged with the head, the rotation of the latter produces a flywheel effect which tends to aid in unwrapping the line from the spool and aids greatly in extending the length of the cast particularly for heavy lines.

During casting, brake member 40 rotates with main shaft 20 and head 22. The cast may be readily controlled, as desired, by pressing the ball of the thumb through opening 41 against the revolving surface of the brake member.

To disengage pinions 27 and 28 for casting, rod 35 is moved downwardly releasing crank shaft 29, in the manner described in my United States Patent No. 2,541,-360, for movement in the right-hand direction under the urging of spring 32, and for maintaining the gears in the disengaged position, thus permitting free rotation of mainshaft 20 and head 22.

When the line is to be rewound, handle 30 is turned in the rewinding direction which, as described in my aforementioned patent, causes rod 35 to return to its upwardly projected position and releases crank shaft 29 to move to the left to effect re-engagement of gears 27 and 28, as illustrated in FIGS. 2 and 5. Rotation of crank shaft 29 in the unwinding direction is prevented by the engagement of pawl 58 with ratchet 57. Rotation of the crank will rotate head 22 in the rewinding direction, one of the notches 25 engaging the line and reeling it on the spool until the line is fully retrieved.

During the normal operations of casting and retrieving, spool 15 will be held stationary by the internal friction of brake member 45 on the spool sleeve. The particular setting of the drag brake will not affect such normal operation. However, in the event a large fish has been hooked, the drag brake will permit some slippage of the spool about hub 13 in response to the pull of the fish. As noted previously, the amount of friction exerted by the brake member 45 on the spool may be varied by suitable adjustment of star wheel 33 to permit slippage of the spool under a pull which is somewhat less than the breaking strength of the line.

The reel construction illustrated in FIGS. 1 to 8 is of relatively rugged design adapted particularly for heavy duty service, as when fishing for large sized fish.

FIGS. 9 and 10 illustrate a somewhat modified design adapted more particularly for fresh water fishing and lighter service generally. The embodiment illustrated in FIGS. 9 and 10 is substantially identical in all respects to that illustrated in FIGS. 1 to 8, differing therefrom only in form and arrangement of the actuating elements employed for expanding and contracting the brake member of the drag brake mechanism. The same numerals are applied to those parts of the embodiment of FIGS. 9 and 10 which are substantially identical with those of FIGS. 1 to 8.

In the modified reel, a crank pin 63 is rotatably journaled in the free end of arm 49 by means of journal pin 64 and extends substantially at a right angle to the plane of arm 49. An adjusting screw 65, threaded at its inner end, as at 66, is screwed through a suitably threaded opening 67 in the outer end of crank pin 63 and projects through an opening 68 in the side of casing 9. A knurled head 69 is provided on the outer end of screw 65 for rotating the latter. A coil spring 70 is mounted about screw 65 in compression between the side wall of casing 9 and a washer 71 secured to screw 65 to normally bias the screw in the inward direction. By means of this actuating arrangement it will be seen that the actuating lever 47 may be rocked in the desired direction by correspondingly turning the adjusting screw 65, which will cause crank pin 63 to travel along threaded section 66 and correspondingly swing arm 49 and actuating lever 47 to vary the internal pressure of brake member 45 on spool 15.

Ratchet 57 and pawl 58 are not shown in the present embodiment, as reverse movement of crank shaft 29 can usually be prevented by thumb pressure applied to thumb brake 40a which, while slightly different in form than the corresponding element 40 of the previously described embodiment, is identical in function. It will be understood, however, that a ratchet and pawl arrangement or other suitable means may be employed to positively prevent reverse rotation of crank shaft 29.

Except as noted, the embodiment illustrated in FIGS. 9 and 10 operates in exactly the same manner as the previously described embodiment.

In the modified form of the invention shown in FIGS. 11–13, reel 104 comprises a tubular casing or frame 109 formed of any suitable material, such as metal, rigid plastic, or the like, and is provided with a front cover 110 which fits snugly over the forward end of frame 109 and may be removed when desired. The forward portion of cover 110 is formed with a forwardly tapered conical portion 111 provided at its apex with a line guide opening 112 through which a line L may pass to and from the interior of the cover. A suitable rear cover 114 fits snugly over the rear of the frame 109 and may be removed when desired. A transverse wall 115 extends across the forward end of frame 109 and has formed in the center thereof a forwardly projecting tubular hub 116, having a bore 117. A line spool 118 is mounted on 116 and is arranged for controlled rotation about 116, as will be more fully described hereinafter. A pivoted keeper 116a serves to releasably lock the spool on 116.

A drag mechanism is arranged between the outer periphery of 116 and the inner wall of spool 118 and comprises an arcuate resilient metal brake member 127 positioned in an arcuate recess 128 provided in the periphery of 116 (see FIG. 13 particularly), one end of the brake member being fixed to a brake actuating lever 129 which extends longitudinally through 116 intermediate the inner and outer peripheries thereof and is rotatable therein. Oscillation of brake lever 129, being secured to one end of the brake member, swings the free end of the brake member toward or away from the inner wall of spool 118 to correspondingly increase and decrease the frictional drag thereon. The free end of the brake member carries a friction pad 130 which may be constructed of any suitable friction-developing material, such as plastic, non-metallic composition materials, and the like. The rearward end of brake lever 129 projects through wall 115 to the rear thereof and has a crank portion 129a which is connected through a link 131 to a crosshead 132 which is threaded on a tubular adjusting member 133 which projects through the wall of the reel frame 109 to the exterior thereof, and is provided on its outer end with a star-shaped adjusting handle 134a. Adjusting member 133 is rotatably supported in a bearing mounted in the wall of casing 109. By rotating handle 134a, crosshead 132 is caused to move back and forth along the threaded portion of the adjusting member 133 to thereby oscillate the brake lever. This swings the brake member 127 toward and away from the inner surface of spool 118 to thereby adjust the drag pressure on the spool.

Line spool 118 is provided with a rear or inner end flange 118a which seats against the forward face of frame wall 115 and has a circular front flange 118b axially spaced from rear flange 118a and tapering outwardly and rearwardly toward the latter, thereby having the forwardly projecting, generally conic form, as shown. A tubular shaft 136 extends axially through bore 117 and is rotatable therein and carries on its inner or rearward end a bevel gear 137 which is fixedly secured on the shaft and bears against the rear face of wall 115. The forward or outer end of shaft 136 extends in front of the forward end of spool 118 and is provided with external threads 138 adapted to threadedly receive a generally circular pick-up head 139 of rearwardly tapered generally conical shape, substantially paralleling forward flange 118b of the line spool. Pick-up head 139 is formed with a hollow central hub 140 which is internally threaded for engagement with threads 138 to thereby secure the pick-up head to the shaft. A sleeve bearing 141 is disposed between shaft 136 and the wall of bore 117. Shaft 136 is provided with an external shoulder forming a stop to limit the extent to which hub 140 will screw down over the end of shaft 136 to thereby provide a clearance space between pick-up head 139 and outer spool flange 135, as shown particularly in FIG. 12. The outer periphery of pick-up head 139 is formed with a rearwardly extending flange 142 which projects over and closely adjacent the outer periphery of spool flange 118b, the inner edge of flange 142 being rounded, as at 142a.

A crank 143 extends through the bore of adjusting member 133 to the exterior of the reel frame 109, being rotatably journaled in adjusting member 133 and in a supporting pillow block 144 mounted on the rear face of wall 115. A winding handle 145 is mounted on the outer end of the crank shaft and is secured thereto by means of a cap nut 146. The inner end of crank shaft 143 has mounted thereon by a press-fit splined connection a bevel gear 147 which meshes with bevel gear 137, whereby rotation of crank shaft 143 will rotate shaft 136 and pick-up head 139.

A cylindrical rod 151 extends slidably through the bore of shaft 136 and through the center of bevel gear 137 and projects rearwardly therefrom. The forward end of rod 151 extends into the bore of hub 140 and is provided on its forward portion, just back of its forward end, with a short section of threads 152 of relatively coarse tapered form. The forward end of rod 151 is shaped to form a forwardly tapered conical surface 153. A line pick-up pin 154 is mounted for substantially radial movement on the inner face of head 139, extending through a passage in hub 140 aligned with an opening 156 in flange 142. The inner end of pin 154 is reversely bent upon itself to form a hook-shaped portion 157, having a bill portion which is positioned for engagement with the threaded end of rod 151. The end of bill portion is cut at an angle to the longitudinal axis of the pin to form a cam surface having a slope or taper which is generally complementary to the slope of surface 153. By reason of its sloping form, the end of the bill portion has a relatively sharp point at its outer edge. The shaft 151 is thus adapted for projecting and retracting the outer end of pin 154 with respect to flange 142. A spring 160 has one end secured to pin 154 and the other end to head 139 so as to normally urge pin 154 outwardly through opening 156. This form of pick-up means is substantially the same as that described in greater detail in my co-pending application Serial No. 459,943, filed October 4, 1954, now Patent No. 2,915,258.

When the reel of FIGS. 11–13 is made ready for casting, the pick-up pin 154 is retracted by a forward movement of the rod 151, and an annular brake member 161 is pressed against flange 142a of the pick-up head 139 to clamp the line L. As the lure is cast, the brake 161 is released, and the line L is drawn freely off of the spool 118, both the spool and the pick-up head 139 being stationary during the cast. For rewinding, the handle 145 is rotated, automatically projecting the pick-up pin 154 into line engaging position and rotating the head 139 to wrap the line about the spool.

During the rewind, if the tension on the line exceeds a pre-set value, the torque applied to the line spool 118 by the line will overcome the friction force of the drag brake member 127 and cause the line spool to rotate. Thus, notwithstanding continued rotation of the pick-up head 139 in a line retrieving direction, the line L may be drawn out of the reel, as when a fish exerts substantial force on the line. Generally, the star wheel 134 will be rotated to a position such that the drag brake will restrain rotation of the spool up to a point somewhat less than that at which the line L will break.

As set forth more particularly in my co-pending application Serial No. 602,566, now Patent No. 2,964,257, the improved reel of FIGS. 11–13 may include a selectively operable ratchet device to prevent reverse rotation of the winding handle 145. With this arrangement, when a fish exerts a sudden strong pull on the line, the handle 145 locks, and the fish acts against the retarding force of the spool drag brake.

The reel of FIGS. 14–16, which is more particularly described in my co-pending application Serial No. 605,798, now Patent No. 2,929,579, is similar to the reel of FIGS. 11–13 but includes a modified form of spool drag brake. Thus, the reel 204 comprises a tubular casing or frame 211 formed of any suitable material, such as metal, rigid plastic, or the like, and is provided with a front cover 212 which fits snugly over the end of frame 211 and may be removed when desired. The forward portion of cover 212 is formed with a forwardly tapered conical portion 213 provided at its apex with a line guide opening 214. A rear cover 215 fits snugly over the rear of the frame 211 and may be removed when desired. A clamping plate 216 may be provided interiorly of the frame, extending across the joints between the frame and the front and rear covers. Screw 218 extends through the wall of frame 211 and thence through the clamping plate, being secured thereto by nut 220. By tightening screw 218 the clamping plate will be caused to clamp the covers to the frame and by loosening the screw the clamping plate may be loosened sufficiently to allow the covers to be pulled off of the ends of the frame.

A transverse wall 222 extends across the forward end of the reel frame 211 and has formed in the center thereof a forwardly projecting tubular hub 223, having a bore 224. A line spool 225 is mounted on hub 223 forwardly of wall 222 and is arranged for controlled rotation about hub 223, as will be more fully described hereinafter. A pivoted keeper 226 serves to releasably lock the spool on hub 223.

A drag brake mechanism is arranged between the outer periphery of hub 223 and the interior wall of spool 225 and comprises an arcuate resilient metal member 227 positioned in an annular groove 228 provided in the periphery of hub 223 and having a pad 227a of friction material at its free end. One end of the brake member is fixed to a brake lever 229 extending longitudinally through the hub 223 intermediate the inner and outer peripheries thereof. Oscillation of brake lever 229, the lever being secured to one end of the brake member, swings the free end of the brake member toward and away from the inner wall of spool 225 to correspondingly increase and decrease the frictional drag thereon in order to vary the drag force on the spool. The rearward end of brake lever 229 projects through wall 222 to the rear thereof and has a crank portion 230 which pivotally mounts a threaded crosshead 231 to which is threaded an adjusting screw 232 which extends through the wall of reel frame 211 to the exterior thereof, and is provided on its outer end with a star-shaped adjusting wheel 232a. By rotating star wheel 232a, crosshead 231 is caused to move back and forth along the threaded portion of the adjusting screw 232 to thereby oscillate the brake lever. This swings the brake member 227 toward or away from the inner surface of spool 225 to thereby adjust the drag pressure on the spool.

Insofar as it is pertinent to the present invention the operation of the reel of FIGS. 14–16 is similar to that of FIGS. 11–13. Accordingly, no further description of the operation will be given.

It should thus be apparent that the invention provides a new and improved form of drag brake for spinning reels. The new apparatus comprises a reel frame having a forwardly projecting hub, on which is received a spool for holding a supply of line. The spool is normally fixed on the hub, but may be rotated upon the application thereto of a predetermined force. A spool retarding brake member is housed within the spool supporting hub, in a manner permitting of a compact reel assembly; and a brake adjusting lever projects through a transverse wall of the reel frame, into the hub, and has an offset actuating arm exposed behind the frame wall. The brake is adjusted by rocking the lever in a manner such that greater or less pressure is applied to a cylindrical sleeve portion of the line spool by a friction member.

The brake actuating linkage of the new reel design is advantageous in that it is economical, highly compact, and is readily accessible at the side of the reel for manipulation by the user. In one form of the invention, the brake member comprises a generally cylindrical band of spring material, which is expanded or contracted by operation of the brake lever. In another form of the invention, the brake member is a cantilever-mounted spring member, secured at one end to the brake lever and pressed into frictional engagement with the sleeve-like center portion of the line spool. The braking force exerted on the spool may be varied by rocking the brake lever to desired positions.

It should be understood, however, that the invention is not necessarily limited to the several specific forms thereof illustrated herein. Reference should therefore be made to the following appended claims in determining the full scope of the invention.

I claim:

1. In a spinning reel of the type comprising a reel frame having a transverse wall and a generally cylindrical hub projecting forwardly from said transverse wall, a line spool mounted forwardly of said transverse wall and having a generally cylindrical portion closely received over said hub and supported thereby, said spool being normally non-rotatable but adapted for controlled rotation on said hub, a line pick-up head positioned forwardly of said line spool, a rotatable shaft extending through said hub and mounting said pick-up head for rotation therewith, line engaging means on said pick-up head for wrapping line around said spool, and drag brake means for controlling the rotation of said spool on said hub, the improvement in said drag brake means characterized by said hub having circumferential recess means underlying the generally cylindrical portion of said line spool, a brake member of arcuate shape received in said recess means and having a portion adapted to press radially outward against the generally cylindrical portion of said line spool to frictionally restrain rotation thereof relative to said reel frame, a brake actuating lever having a portion projecting longitudinally into said hub and engaging an end portion of said brake member, said lever portion comprising the sole mounting support for said brake member, said brake actuating lever being adapted upon rotational movement thereof to vary the pressure exerted by said brake member upon said line spool, said brake actuating lever having an arm portion exposed at the back of said transverse wall, and brake adjusting means extending transversely of said reel frame and exposed exteriorly of the side of said reel frame for imparting rotational movement to said brake actuating lever.

2. The spinning reel of claim 1, wherein said brake member is a generally circular band extending around said hub and engaging said brake actuating lever at both ends, said band being expanded and contracted by rotational movements of said lever.

3. The spinning reel of claim 1, wherein said brake adjusting means includes a crosshead pivotally carried by the arm portion of said brake actuating lever, and a threaded adjusting screw engaging said crosshead and having a portion extending transversely of and through said reel frame and exposed exteriorly thereof.

4. The spinning reel of claim 1 in which said brake member is a segmental member of arcuate shape secured at one end to said brake actuating lever and has a free end spaced circumferentially of said lever, and said recess means comprises an arcuate segmental recess.

5. The spinning reel of claim 1 in which said brake member is a segmental member of arcuate shape secured at one end to said brake actuating lever and has a free end spaced circumferentially of said lever, and said recess means comprises an annular groove in said hub intermediate the ends thereof.

6. The spinning reel of claim 1 in which said brake member is a segmental member of arcuate shape secured at one end to said brake actuating lever and has a free end spaced circumferentially of said lever, and a pad of friction material is carried at the free end of said brake member.

7. In a spinning reel of the type comprising a reel frame having a transverse wall and a generally cylindrical hub projecting forwardly from said transverse wall, a line spool mounted forwardly of said transverse wall and having a generally cylindrical portion closely received over said hub and supported thereby, said spool being normally non-rotatable but adapted for controlled rotation on said hub, a line pick-up head positioned forwardly of said line spool, a rotatable shaft extending through said hub and mounting said pick-up head for rotation therewith, line engaging means on said pick-up head for wrapping line around said spool, and drag brake means for controlling the rotation of said spool on said hub, the improvement in said drag brake means characterized by said hub having circumferential recess means underlying the generally cylindrical portion of said line spool, a brake member of arcuate shape received in said recess means and having a portion adapted to press radially outward against the generally cylindrical portion of said line spool to frictionally restrain rotation thereof relative to said reel frame, a brake actuating lever having a portion projecting longitudinally into said hub and engaging a portion of said brake member, said brake actuating lever being adapted upon rotational movement thereof to vary the pressure exerted by said brake member upon said line spool, said brake actuating lever having an arm portion exposed at the back of said transverse wall, and brake adjusting means for imparting rotational movement to said brake adjusting lever comprising a link pivotally connected to the arm portion of said lever and extending transversely of said reel frame, a threaded crosshead pivotally connected to said link and a threaded member exposed externally of said reel frame and engaging said crosshead interiorly of said reel frame.

8. The spinning reel of claim 7, which includes a shaft extending transversely of said reel frame and exposed exteriorly thereof for rotating said line pick-up head, and said threaded member is a tubular member received over said shaft.

9. The spinning reel of claim 7, wherein said threaded member is disposed generally parallel to said transverse wall, and said crosshead includes portions bearing slidably against said wall whereby to prevent rotation of said crosshead.

10. In a spinning reel of the type comprising a reel frame having a transverse wall and a generally cylindrical hub projecting forwardly from said transverse wall, a line spool mounted forwardly of said transverse wall and having a generally cylindrical portion closely received over said hub, said spool being normally non-rotatable but adapted for controlled rotation on said hub, a rotatable pick-up member having line engaging means for wrapping line around said spool, and drag brake means for controlling the rotation of said spool on said hub, the improvement in said drag brake means characterized by a brake member received between said hub and the generally cylindrical portion of said spool and having a portion adapted to press radially outward against said spool to frictionally restrain rotation thereof relative to said reel frame, and adjustable brake actuating means having a rotatable portion projecting longitudinally into said hub and engaging an end portion of said brake member, said rotatable portion of said brake actuating means comprising the sole mounting support for said brake member, said brake actuating means being adapted upon manipulation thereof to rotate said portion to vary the pressure exerted by said brake member upon said line spool, said brake actuating means having a portion exposed exteriorly of said reel frame.

11. The spinning reel of claim 10, wherein an annular recess means is defined between said hub and the generally cylindrical portion of said line spool, and said brake member is received in said recess means.

12. In a fishing reel of the spinning type, including a casing, a line-carrying spool mounted in the casing, a line pick-up head mounted for rotation in said casing adjacent said spool to wind line on said spool, line-engaging means carried by said line pick-up head and movable to one position to engage line passing to said spool and to a second position in which it is free from engagement with said line as said line leaves said spool as during casting, and means for moving said line-engaging means to said second position, the improvement which comprises a forwardly projecting stationary hub in said casing received in a central opening in said spool and supporting said spool, said hub having a circumferential groove in the surface thereof intermediate its length, a crank having one end extending forwardly into said hub and said groove and its other end extending rearwardly outward therefrom, means extending through the wall of said casing and connected to said other end of said crank for rotation of said crank from without the casing, a resilient drag member located substantially within said groove in said hub with one end supported by said one end of said crank, and a friction pad mounted on the other end of said drag member and movable in varying degrees into resilient contact with said spool upon rotation of said crank to place a variable drag force on said spool to resist rotation thereof on said hub, said one end of said crank providing the sole mounting support for said drag member.

13. In a spinning reel of the type comprising a reel frame having a transverse wall and a generally cylindrical hub projecting forwardly from said transverse wall, a line spool mounted forwardly of said transverse wall and having a generally cylindrical internal wall forming a bearing surface by which said spool is supported for rotation around said hub, said spool being normally non-rotatable but adapted for controlled rotation on said hub, a rotatable pick-up member having line engaging means for wrapping line around said spool, and drag brake means for controlling the rotation of said spool on said hub, the improvement in said drag brake means characterized by a drag brake member received intermediate said hub and said generally cylindrical internal wall of said line spool, said drag brake member comprising a circumferentialy disposed element formed of resilient material and radially distortable to press radially outward against the internal wall of said line spool to frictionally restrain rotation thereof relative to said reel frame, and adjustable brake actuating means comprising an axially extending element projecting through said transverse wall and within the generally cylindrical internal wall of said spool and engaging said radially distortable drag brake element, said brake actuating means including means exposed exteriorly of said reel frame for rapid manual variation of braking force on the line spool, and said resilient drag brake member being radially distorted by said brake actuating means and thereby constantly urged radially outward against the internal wall of said line spool at varying pressures adjustable by said brake actuating means.

References Cited in the file of this patent
UNITED STATES PATENTS

| | | |
|---|---|---|
| 1,694,203 | Brault et al. | Dec. 4, 1928 |
| 2,042,390 | Crary | May 26, 1936 |
| 2,521,543 | Shakespeare et al. | Sept. 5, 1950 |
| 2,630,978 | Skarliek | Mar. 10, 1953 |
| 2,929,578 | Hull | Mar. 22, 1960 |